US012607987B2

(12) United States Patent
Anthony et al.

(10) Patent No.: US 12,607,987 B2
(45) Date of Patent: Apr. 21, 2026

(54) PROMPT ENGINEERING FOR ARTIFICIAL INTELLIGENCE ASSISTED INDUSTRIAL AUTOMATION DEVICE TROUBLESHOOTING

(71) Applicant: Rockwell Automation Technologies, Inc., Mayfield Heights, OH (US)

(72) Inventors: Michael J. Anthony, Milwaukee, WI (US); Clark L. Case, Aurora, OH (US); Michael P. D'Amico, East Troy, WI (US); Taryl J. Jasper, South Euclid, OH (US); Eryn Amara Danielle Manela, Cleveland Heights, OH (US); David C. Mazur, Mequon, WI (US); Jonathan A. Mills, Mayfield Heights, OH (US); Nathaniel S. Sandler, Cleveland, OH (US); Kurt D. Sneen, Park City, UT (US); David A. Snyder, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 425 days.

(21) Appl. No.: 18/343,551

(22) Filed: Jun. 28, 2023

(65) Prior Publication Data

US 2025/0004450 A1 Jan. 2, 2025

(51) Int. Cl.
*G05B 19/418* (2006.01)

(52) U.S. Cl.
CPC ................... *G05B 19/4184* (2013.01); *G05B 2219/31449* (2013.01)

(58) Field of Classification Search
CPC ................. G05B 19/4184; G05B 2219/31449
USPC ........................................................ 700/79
See application file for complete search history.

(56) References Cited

U.S. PATENT DOCUMENTS

| | | | |
|---|---|---|---|
| 10,997,308 B2* | 5/2021 | Ericsson ............ | G05B 23/0216 |
| 2019/0012390 A1* | 1/2019 | Nishant .............. | G06F 16/9535 |
| 2021/0096542 A1* | 4/2021 | Stump ................ | G05B 19/4184 |

\* cited by examiner

*Primary Examiner* — Jigneshkumar C Patel

(57) ABSTRACT

The present technology relates to artificial intelligence assisted device troubleshooting. In an implementation, an interface service of a human machine interface application trains a machine learning model on the content of an embeddings database. The interface service then receives an input comprising a context of an automation system design. The interface service generates a prompt that includes an instruction for the ML model to identify an anomaly type associated with the context of the automation system design and to generate a solution that addresses the anomaly type. The interface service transmits the prompt to the ML model and receives a response from the ML model that includes the anomaly type and the requested solution. After receiving a response, the interface service may modify the automation system design based on the content of the response and surface a graphical user interface that includes the modified design.

20 Claims, 8 Drawing Sheets

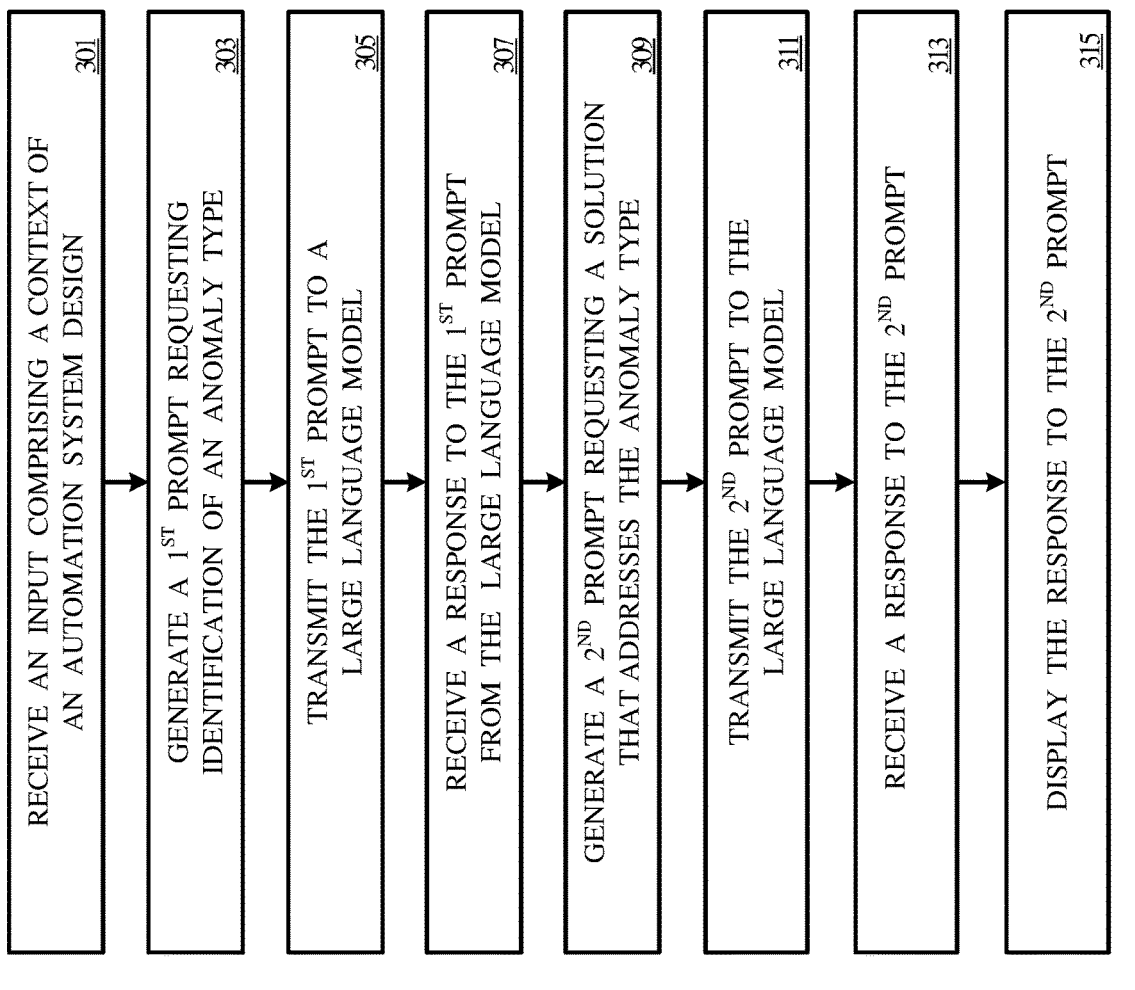

RECEIVE AN INPUT COMPRISING A CONTEXT OF AN AUTOMATION SYSTEM DESIGN 301

GENERATE A 1ST PROMPT REQUESTING IDENTIFICATION OF AN ANOMALY TYPE 303

TRANSMIT THE 1ST PROMPT TO A LARGE LANGUAGE MODEL 305

RECEIVE A RESPONSE TO THE 1ST PROMPT FROM THE LARGE LANGUAGE MODEL 307

GENERATE A 2ND PROMPT REQUESTING A SOLUTION THAT ADDRESSES THE ANOMALY TYPE 309

TRANSMIT THE 2ND PROMPT TO THE LARGE LANGUAGE MODEL 311

RECEIVE A RESPONSE TO THE 2ND PROMPT 313

DISPLAY THE RESPONSE TO THE 2ND PROMPT 315

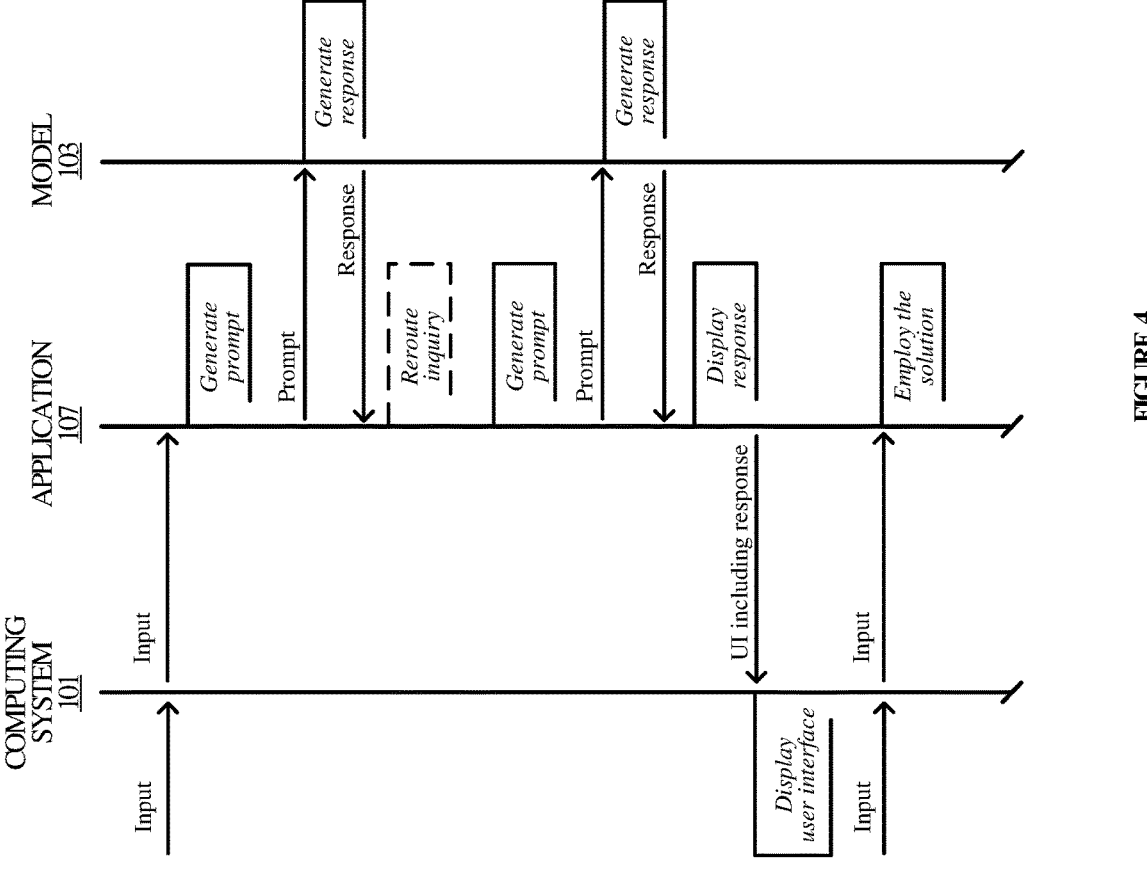
FIGURE 4

PROMPT ENGINEERING FOR ARTIFICIAL INTELLIGENCE ASSISTED INDUSTRIAL AUTOMATION DEVICE TROUBLESHOOTING

RELATED APPLICATIONS

This U.S. Patent Application is related to co-pending U.S. patent application Ser. No. 18/343,374, entitled "PROMPT ENGINEERING FOR ARTIFICIAL INTELLIGENCE ASSISTED INDUSTRIAL AUTOMATION DEVICE CONFIGURATION," filed Jun. 28, 2023; and co-pending U.S. patent application Ser. No. 18/343,481 entitled "PROMPT ENGINEERING FOR ARTIFICIAL INTELLIGENCE ASSISTED INDUSTRIAL AUTOMATION SYSTEM DESIGN," filed Jun. 28, 2023, which are incorporated herein by reference in their entirety for all purposes.

TECHNICAL FIELD

Various embodiments of the present technology relate to industrial automation environments and particularly to troubleshooting devices and systems of an industrial automation environment.

BACKGROUND

Industrial automation systems are designed to control and optimize manufacturing processes in industries such as manufacturing, automotive, and food processing. These systems typically include networks of sensors, actuators, controllers, and software that work together to collect and analyze data. Some common types of industrial automation systems include, by way of example, Programmable Logic Controllers (PLCs), Distributed Control Systems (DCSs), Supervisory Control and Data Acquisition (SCADA) systems, etc. These systems can be designed and programmed to perform a wide range of tasks, such as monitoring and adjusting production processes, controlling the movement of materials and products, and ensuring the safety of workers and equipment.

However, failures sometimes occur within and between the devices and systems of an industrial automation system. For example, a device may be configured incorrectly, the device may be using communication protocols that are incompatible with other devices of the system, device connections may not be functioning properly, a device may not be receiving adequate power, etc. Troubleshooting the devices and systems in an automation environment involves identifying and resolving these issues and failures that prevent the system from functioning properly. As a result, effective troubleshooting helps to minimize downtime, increase system efficiency, and maintain optimal production levels. While machine learning (ML) algorithms may be used in industrial automation environments (e.g., to adjust a device setting based on sensor data, etc.), not much progress has been made in the design and implementation of accurate and reliable ML models that facilitate troubleshooting the devices and assets of an industrial automation system.

SUMMARY

Technology disclosed herein includes a prompt engineering interface service that integrates artificial intelligence with the programming systems of an industrial automation environment to troubleshoot the devices and systems of an industrial automation environment. The prompt engineering interface service leverages the capabilities of a large language model (LLM) trained on industrial automation workflows to provide accurate and relevant troubleshooting guidance. For example, the prompt engineering interface service may generate a natural language prompt that includes instructions (e.g., for the LLM, etc.) to identify or otherwise categorize a type of anomaly based on a context of an automation system design. The prompt may also include instructions to identify and/or generate a solution that addresses the type of anomaly. The prompt engineering interface service may transmit the prompt to an LLM or other machine learning (ML) model and then receive a response generated by the LLM (or ML model) based on the parameters of the prompt. After receiving a response, the prompt engineering interface service may incorporate the content of the response into a user interface message for display to a user. In the same or alternative embodiment, the prompt engineering interface service modifies the automation system design based on the content of the response and surfaces a graphical user interface (GUI) that includes the modified design.

In an implementation, a software application on a computing device directs the device to receive an input comprising a context of an automation system design via a graphical user interface of a human machine interface application. The software application then directs the device to generate a first prompt requesting identification of an anomaly type associated with the context of the automation system design. The first prompt may be generated based at least in part on system information of the automation system design. The software application further directs the device to transmit the first prompt to a large language model and receive a first response to the first prompt from the large language model. The first response includes the anomaly type.

In the same or other embodiment, the software application directs the device to generate, based on the system information and the anomaly type, a second prompt requesting a solution that addresses the anomaly type. The software application further directs the device to transmit the second prompt to the large language model and receive a second response to the second prompt that includes the solution. The software application then directs the device to display the second response via the GUI. The software application may further direct the device to change the automation system design in accordance with the solution.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings.

FIG. 3 illustrates an exemplary troubleshooting process in accordance with some embodiments of the present technology.

FIG. 4 illustrates an exemplary operational scenario in accordance with some embodiments of the present technology.

Figure 1:
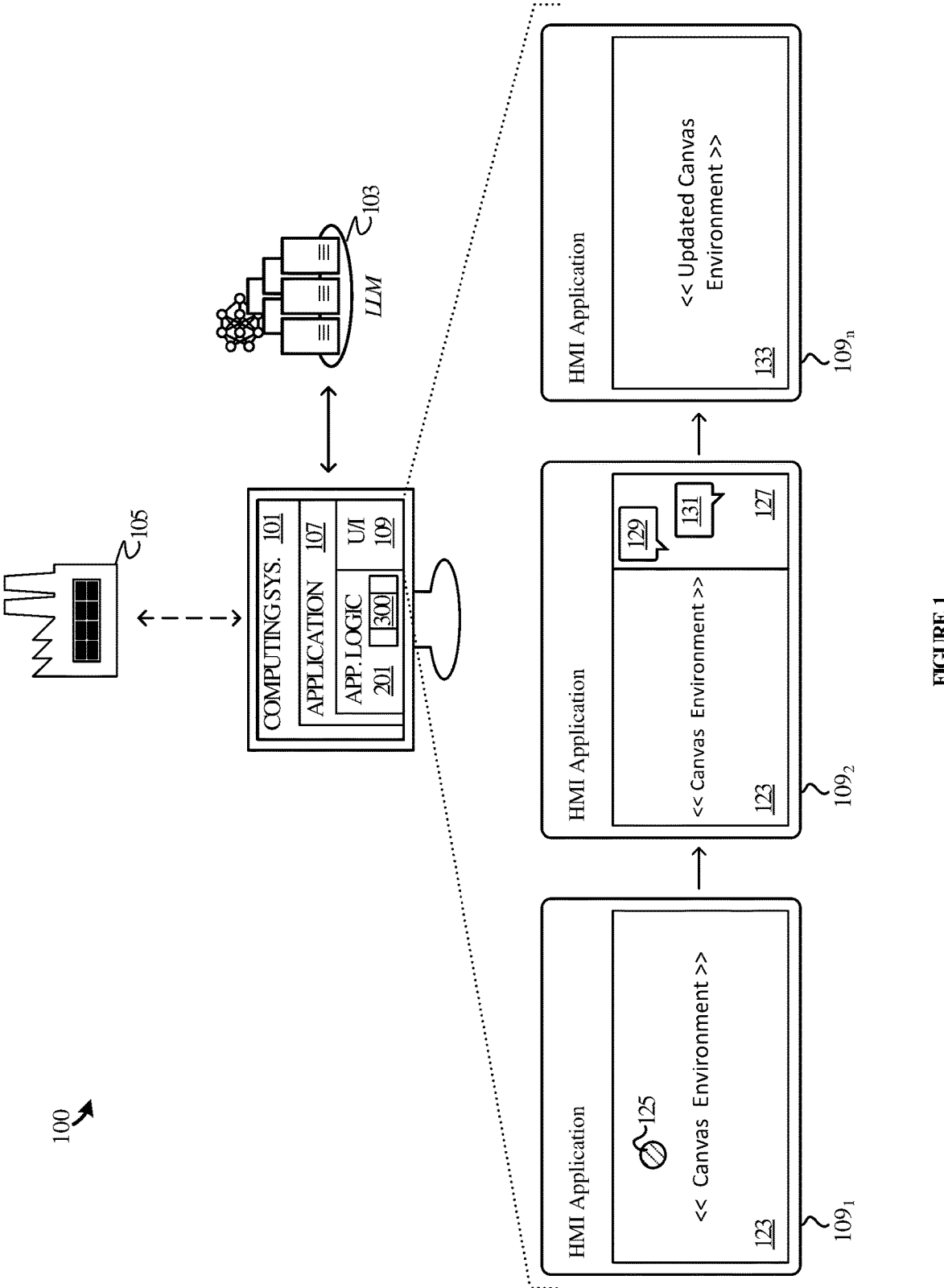
FIG. 1 illustrates an exemplary operating environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims. In the drawings, like reference numerals designate corresponding parts throughout the several views.

DETAILED DESCRIPTION

Various embodiments of the present technology relate to integrating troubleshooting processes of industrial automation environments with prompt engineering techniques. Prompt engineering refers to a natural language processing concept that includes designing, developing, and refining input data (e.g., prompts) that are used to interact with artificial intelligence (AI) models, such as large language models (LLMs). The prompts are instructions that guide an AI model's behavior to produce a desired output (e.g., troubleshooting anomalies, etc.). Unfortunately, it is difficult to engineer prompts for integration into the troubleshooting activities of industrial automation environments.

For example, troubleshooting involves checking device settings, communication protocols, connections, power supplies, device or system inputs, device or system outputs, etc. to isolate and diagnose anomalies (e.g., failures, errors, issues, etc.) that prevent the system from functioning properly. Existing AI models are inadequate to perform meaningful troubleshooting activities at least because the AI models lack human intuition (e.g., the ability to make intuitive decisions based on experience or knowledge of the system, etc.), have limited understanding of system context (e.g., operating environments, regulatory requirements, safety protocols, etc.), and have data biases that are a result of the accuracy (or lack thereof) of the data upon which the AI model is trained. These shortcomings of AI models can result in misdiagnosing or misinterpreting issues in the system. Moreover, these limitations of AI models may lead to incorrect recommendations that pose safety hazards, result in significant financial losses, cause malfunctions in individual devices or an entire system, etc. Also, concerns about data privacy and security in industrial automation environments can limit the availability of data needed for training and testing AI models. Thereby making it challenging to build accurate and reliable models that can be used in industrial settings.

To address these issues, a prompt engineering interface service is described herein that optimizes troubleshooting tasks for industrial automation systems and devices. The prompt engineering interface service utilizes past workflows (e.g., saved projects, helpdesk entries, error logs, etc.) of industrial automation environments to respond to anomalies (e.g., issues, errors, failures, etc.) with accurate and relevant troubleshooting information. The prompt engineering interface service may use a variety of techniques such as natural language processing, machine learning, and deep learning to develop accurate and effective prompts for use with large language models, chatbots, virtual assistants, and the like. For example, the prompt engineering interface service may generate natural language prompts to identify or otherwise categorize an anomaly associated with a device on a network of an industrial automation system. In the same or another example, the prompt engineering interface service may generate natural language prompts to obtain relevant and accurate responses from an LLM that include solutions to address or otherwise resolve the anomaly.

In an embodiment implemented in software on one or more computing devices, an interface service receives an input that includes a context of an automation system design. For example, a user may add a device to a design environment and attempt to associate the device with a controller, a user may access error logs associated with a device or system, a user may submit a query that requests help troubleshooting a device or system, a troubleshooting specialist may remotely link a user's host application environment to facilitate troubleshooting activities, etc., which the interface service receives as the input. The interface service may contextualize the input (e.g., using machine learning techniques) to determine if the input pertains to the design of a device, a process, a system, etc.; the operation of a device, a process, a system, etc.; a troubleshooting request; etc.

The interface service may then generate a natural language prompt that includes instructions for an LLM to identify or otherwise categorize an anomaly based on a context of an automation system design. Examples of an automation system design context include content of a design environment (e.g., ladder logic, graphical representations of devices, etc.), attributes of the user input (e.g., adding a new device, connecting devices, editing device configuration, editing relationships between devices of a system, editing inputs to or outputs from a device, viewing error logs, receiving a failure notification, etc.), information stored in association with a user's account, information stored in association with a customer company, etc. The prompt may include example anomaly types, such as design issues (e.g., device settings don't match the required specifications for the system, etc.), protocol issues (e.g., the device uses a communication protocol that is incompatible with the rest of the system, etc.), connection issues (e.g., device fails to connect with an associated controller, etc.), power supply issues (e.g., the device does not receive enough power to achieve optimal functionality, etc.), regulatory compliance (e.g., the current system doesn't does not meet a specific known standard), etc. The prompt may include system information such as power capabilities of the system, attributes of the system, relationships between the devices of the system, data models of the system, device type (e.g., pump, actuator, motor, sensor, etc.), controller type (e.g., programmable logic controller, etc.), system taxonomy (e.g., communication protocols, connected devices, product inputs, product outputs, etc.), etc.

The interface service then transmits the prompt to an LLM and receives a response based on the parameters of the prompt. The response includes the anomaly type and may further include a solution that addresses the anomaly type. Example solutions include proposals to change the automation system design by modifying device hardware, software, controller code, layout, timing, inputs, outputs, etc. Example solutions may further include insights to supply chain issues and suggest alternatives that may avoid the supply chain issues (e.g., suggest alternative devices that have improved lead times, etc.). Alternatively, the interface service may generate a second prompt requesting the LLM to generate a solution that addresses the anomaly type.

Troubleshooting the devices and systems of an industrial automation environment can be a challenging task, owing in part to the complexity of the systems and the devices that operate in the system. By generating prompts and leveraging the capabilities of an LLM, the troubleshooting operations described here identifies anomalies and their respective solutions to maintain or improve the efficiency, safety, reliability, and other key performance factors of an industrial automation environment. Other technical advantages of the troubleshooting operations disclosed herein include increased computational efficiency and adaptability. For example, by leveraging advanced modeling techniques, these operations require less power consumption by local computing devices, resulting in optimized resource usage. Additionally, the models associated with these operations can learn from new data and adapt their behavior over time, improving the accuracy and efficacy of troubleshooting the devices and systems within an industrial automation environment.

Figure 8:
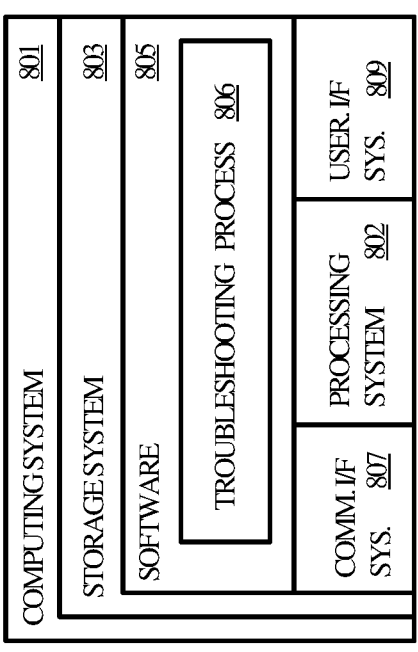
FIG. 8 illustrates a computing system suitable for implementing the various operational environments, architectures, processes, scenarios, and sequences discussed below with respect to the other Figures.

Turning now to the Figures, FIG. 1 illustrates operating environment 100 in an embodiment. Operating environment 100 includes computing system 101, model 103, and industrial automation environment 105. Computing system 101 is representative of any physical or virtual computing resource, or combination thereof, suitable for executing application 107, of which computing device 801 of FIG. 8 is representative. Examples of computing system 101 include, but are not limited to, personal computers, laptop computers, tablet computers, mobile phones, wearable devices, external displays, virtual machines, and containers, as well as any variation, combination, or collection thereof. Computing system 101 may communicate with model 103 and/or industrial automation environment 105 via one or more network connections, examples of which include internets and intranets, the Internet, wired and wireless networks, low power wireless links, local area networks (LANs), and wide area networks (WANs). Computing system 101 includes application 107. Though computing system 101 is depicted as being separate from industrial automation environment 105, it is contemplated herein that computing system 101 may be located on the premises of industrial automation environment 105 or connected remotely thereto, for example, via a cloud-based application.

Model 103 is representative of an LLM capable of processing natural language requests to generate a desired output (e.g., a natural language response, computer code, etc.). Examples of model 103 include a Generative Pretrained Transformer (GPT) model, a Bidirectional Encoder Representations from Transformer (BERT) model, and the like. Example models include GPT-2, GPT-3, GPT-4, BLOOM, LaMDA, LLaMA, MICROSOFT TURING, and the like. Further, new models are developing that accept other modes of input including text, audio, video, images, and the like, which are referred to as large multi-mode models (LMMMs). Accordingly, model 103 may be an LLM or an LMMM. While language throughout refers to an LLM, LMMMs may be interchanged. Model 103 may be trained (e.g., via application 107) using content of an embeddings database and/or domain (not shown). An embedding database includes natural language content that is organized and accessed programmatically. The natural language content includes an embedding, which is a vector notation representative of the content as processed by a natural language model. Content of an embedding database may include system designs of saved projects, system designs of sample projects, existing validated documentation, defined bill of materials, programming manuals of devices and systems of an industrial automation system, relevant specifications of devices and systems of an industrial automation system, helpdesk articles and submissions associated with industrial automation systems, customer support tickets, error logs, example anomalies, etc. The embedding database may be dynamically updated by collecting analytics from a device or system based on code, performance, etc. Though model 103 is depicted as being separate from industrial automation environment 105, it is contemplated herein that model 103 may be hosted on the premises of industrial automation environment 105 or hosted on a server remote to industrial automation environment 105.

Industrial automation environment 105 is representative of an industrial enterprise such as an industrial mining operation, an automobile manufacturing facility, a food processing plant, an oil drilling operation, a microprocessor fabrication facility, etc. Industrial automation environment 105 includes various machines that may be incorporated in one or more systems of industrial automation environment 105, such as drives, pumps, motors, compressors, valves, robots, actuators, and other mechanical devices. The machines, systems, and processes of industrial automation environment 105 may be located at a single location or spread out over various disparate locations.

Application 107 is representative of a human machine interface (HMI) application implemented in software and, when executed by computing system 101, renders user interface 109. Application 107 is implemented in program instructions that comprise various software modules, components, and other elements of the application. Software 805 of FIG. 8 is representative of application 107. Application 107 may be a locally installed and executed application (e.g., of computing system 101), a desktop application, a mobile application, a streamed (or streaming) application (e.g., a cloud-based HMI application accessed by computing system 101), a web-based application that is executed in the context of a web-browser, or any other type of application capable of employing application logic 201. Some commercial examples of application 107 include, but are not limited to, Rockwell Automation Studio 5000®, FactoryTalk Design Studio®, FactoryTalk Logix Echo®, and the like.

Application logic 201 (as illustrated by application logic 201 of FIG. 2) is representative of some of the functionality that may be provided by one or more of the software elements in application 107. For example, application logic 201 may be a plug-in that may be added to or otherwise accessed by application 107. Application logic 201 performs functionality such as process 300, which is described in more detail with respect to FIG. 3. Application logic 201 may be implemented in program instructions in the context of any of the software applications, modules, components, or other such elements of application 107. Application 107 employs application logic 201 to direct computing system 101 to operate as follows.

In an embodiment, computing system 101 displays, via application 107, exemplary user interfaces $109_1$-$109_n$. User interface $109_1$ includes an initial view of canvas environment 123. Canvas environment 123 includes an integrated troubleshooting environment in which users may design, view, and otherwise interact with devices and systems of an industrial automation environment (e.g., to configure devices such as controllers, HMIs, Electronic Operator Interfaces, etc.; manage communications between devices; observe device operations, etc.). Canvas environment 123 may further include one or more of the following editors: ladder diagram, function block, structured text, sequential function chart, etc.

User interface $109_1$ also includes user input 125. User input 125 includes a context of an automation system design, such as creating a new data model, opening an incomplete data model, adding a device to a data model or otherwise editing an existing data model, associating a device with a controller, accessing error logs of a device or system, reviewing operations of a system, and the like. User input 125 may also include a drag-and-drop of a graphic representation of an industrial device (e.g., a driver of a conveyor system, a pump, a motor, a compressor, a valve, a robot, a program logic controller, etc.), an alpha-numeric query (e.g., a request for information, a request for help, a request to troubleshoot a device of an industrial automation environment, etc.), the creation of a link between a remote/agent computing device and a host computing device, a mouse click, a gesture, a voice command, etc.

Responsive to receiving user input 125 via user interface $109_1$, application 107 employs application logic 201 to generate a prompt (not shown) for submission to model 103. The prompt contains a natural language query requesting troubleshooting information (e.g., identification of an anomaly type, a solution that addresses the anomaly type, a request for the user to provide additional information, etc.). The prompt may be generated in response to receiving the input, in response to receiving a second input requesting assistance troubleshooting a device or system, in response to receiving an input indicating an acceptance for help developing the solution, in response to detecting an anomaly, etc. Application 107 may generate the first prompt by providing the input to a natural language model that transforms the input into an embedding. The embedding may be included in the first prompt and used by model 103 to select relevant content from an embedding database (e.g., using natural language). After receiving the prompt, model 103 replies to application 107 with the requested troubleshooting information.

Next, computing system 101 displays, via application 107, user interface $109_2$. User interface $109_2$ includes the initial view of canvas environment 123 as well as messaging panel 127. Messaging panel 127 is representative of a chat window through which a user communicates with application 107 (e.g., via application logic 201, etc.). Messaging panel 127 may include buttons, menus, or images that can be used to provide additional information or context. Though messaging panel 127 is depicted as being a sidebar panel of user interface $109_2$, it is contemplated herein that messaging panel 127 can be any user interface component capable of supporting user interactions with application 107 in a natural and conversational manner. For example, messaging panel 127 may be a popup or dialog window that overlays the content of canvas environment 123, and the like.

Messaging panel 127 includes messages 129 and 131. Application 107 generates message 129, which computing system 101 surfaces in user interface $109_2$. For example, application 107 may generate message 129 in response to receiving user input 125, in response to receiving a reply from model 103, a combination thereof, etc. Message 129 may include an offer to provide assistance troubleshooting content of canvas environment 123, a request for additional information to facilitate troubleshooting activities, an offer to implement a solution that addresses an anomaly, and the like. Message 131 includes a user's reply to message 129. In the present embodiment, message 131 includes a positive indication for accepting the troubleshooting assistance offered via message 129.

In response to message 131, application 107 implements the troubleshooting assistance (not shown) and causes user interface $109_n$ to be displayed by computing system 101. User interface $109_n$ includes updated canvas environment 133, which reflects updates made to the content of canvas environment 123. Application 107 may also (e.g., in response to message 131) provide lead times for equipment proposed as part of a solution that addresses the anomaly; provide alternatives to existing or proposed equipment; order proposed equipment; configure a device, system, and/or process of industrial automation environment 105 based on the solution; etc.

Figure 2:
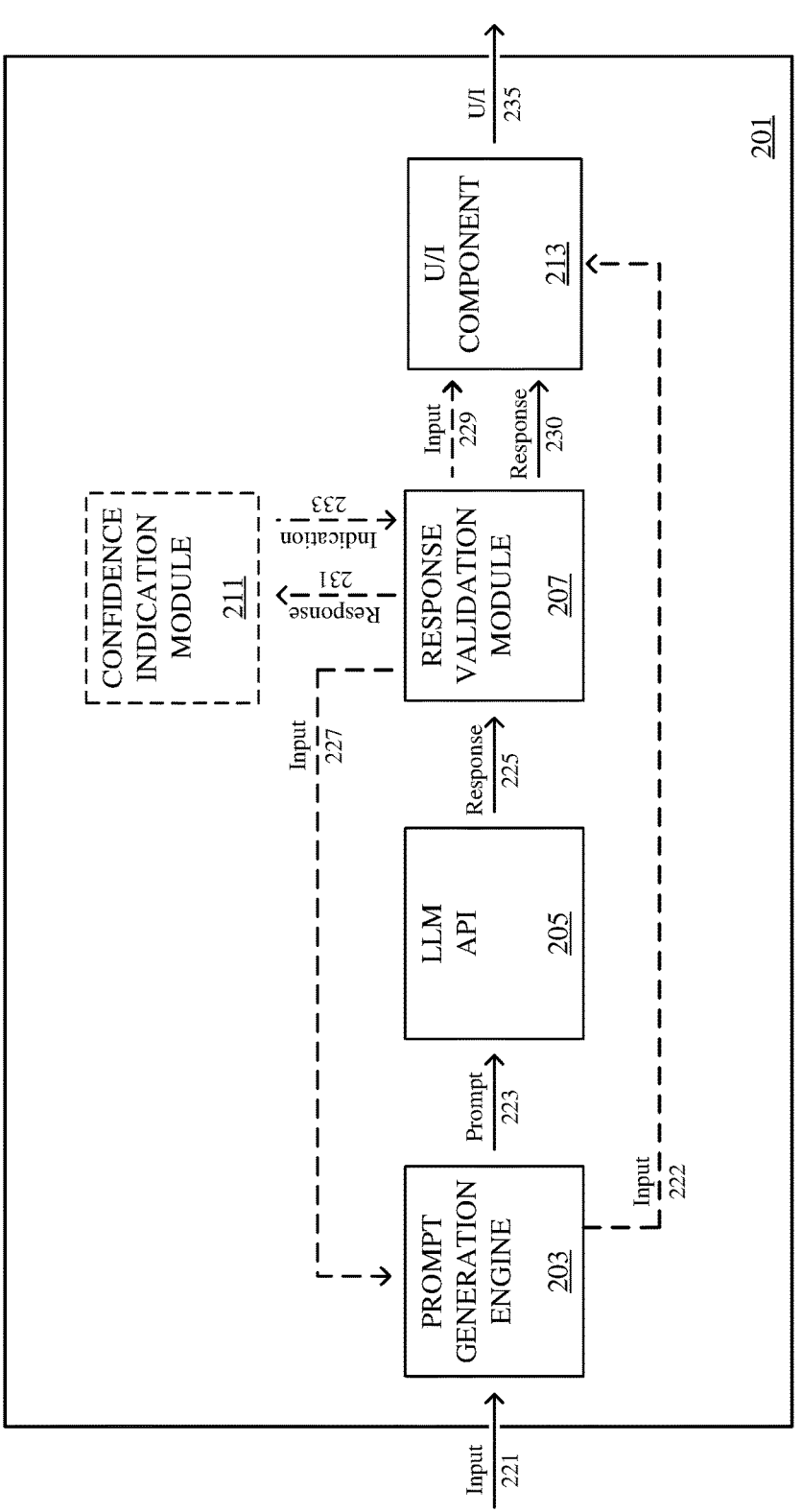
FIG. 2 illustrates a conceptual schematic environment in accordance with some embodiments of the present technology.

FIG. 2 illustrates a conceptual schematic 200 for troubleshooting devices and systems of an industrial automation environment in accordance with some embodiments of the present technology. Schematic 200 includes application logic 201, of which application 107 of FIG. 1 and software 805 of FIG. 8 may be representative. Application logic 201 is implemented in program instructions that comprise various software modules, components, and other elements of the application such as engine 203, API 205, module 207, module 211, and component 213. Application logic 201 may be a locally installed and executed application, a desktop application, a mobile application, a streamed (or streaming) application, a web-based application that is executed in the context of a web-browser, or any other type of application capable of employing process 300 of FIG. 3. Though the functionality of application logic 201 is described as occurring within specific modules, it is contemplated herein that the disclosed functionality may be implemented by one or more of the software modules, components, and/or other elements of application logic 201 without departing from the scope of the disclosure.

Engine 203 is representative of a prompt generation engine that employs natural language processing and machine learning algorithms to generate natural language prompts for submission to LLMs (e.g., model 103 of FIG. 1). Engine 203 includes a natural language model, a prompt database, and a prompt generator. The prompt database contains prompts that are related to fine-tuned models that were trained on task-specific data (e.g., acceptable questions and corresponding answers, speaking with a specific voice, categorization, identifying context of a user input, identifying errors associated with devices and systems, etc.) to learn patterns in language used in industrial automation environments and to understand the nuances of said language. The prompt generator of engine 203 uses the natural language model and prompt database to generate natural language prompts in response to user inputs (e.g., inputs 221 and 227). The prompt generator may use a variety of techniques, including rule-based systems, machine learning algorithms, and deep learning models, to generate accurate and effective prompts. Engine 203 is further configured to receive inputs 221 and 227 and to generate input 222 and prompt 223.

Engine 203 may also use a content gate that includes various rules to filter out user inputs when certain types of questions or information are encountered. For example, the content gate may, based on the various rules, prohibit answering queries that do not pertain to industrial automation systems, a troubleshooting activity, etc.; that are related to safety critical items or items for which human life may be in danger; etc. In such a scenario, engine 203 may generate input 222 and transmit input 222 to component 213. Input 222 may indicate that the user's inquiry cannot be answered and may instruct component 213 to either generate a user interface (e.g., requesting additional input, etc.) or cease interacting with the user (e.g., close a chat window, etc.). In the same or other embodiment, the content gate may include a rule to respond to a question that relates to a helpdesk entry by summarizing the helpdesk entry and providing additional information (e.g., a solution that addresses an anomaly type, etc.), to respond to a question that is unrelated to industrial automation by stating that only answers related to industrial automation can be answered, etc.

API 205 is representative of an application programming interface (API) to a large language model. Specifically, API 205 includes a set of programming instructions and standards for accessing and interacting with an LLM (e.g., model 103). API 205 is configured to receive prompt 223 from engine 203, transmit prompt 223 to the LLM, receive response 225 from the LLM, and transmit response 225 to module 207.

Module 207 is representative of a response validation module and is responsible for evaluating the quality and accuracy of responses received by API 205 from an LLM. To ensure the quality and accuracy of a response, module 207 may use a combination of rule-based systems and machine learning algorithms to validate the response and ensure that it meets certain criteria. For example, module 207 may validate a response based on factors such as the relevance of the response to a user's query (e.g., input 221), the accuracy of the information presented in the response, the naturalness and fluency of the language used in the response, etc. The response may also be validated to ensure it is free of biasing, expletives, and the like. Because LLMs are trained on enormous data sets that are not reviewed prior to training, the responses may include invalid data, erroneous data, biased data, inappropriate data, and the like. Module 207 may also incorporate feedback mechanisms that incorporate user ratings of the quality of responses as well as other feedback to improve future responses. Module 207 is further configured in some embodiments to receive response 225 from LLM API 205 and indication 233 from module 211. Module 207 is further configured in some embodiments to generate input 227 and response 231. Accordingly, in some embodiments, the LLM may validate its own response. Module 207 outputs the response 230 upon validation.

Module 211 is representative of an optional confidence indication module that provides an indication of the accuracy of the responses received from an LLM. Module 211 uses machine learning algorithms to analyze the response and generate a confidence score for each received response. The confidence score may be based on factors such as the accuracy of the language model, the relevance of the response to the user's query, and the degree of uncertainty in the data. Additionally, the confidence score can be used by application logic 201 to monitor the performance of engine 203 with regard to the responses received by the LLM and identify areas for improvement. Module 211 is further configured to receive response 231 and to generate indication 233.

Component 213 is representative of a user interface component that presents graphical user interfaces for surfacing prompts, system configuration information, data models, etc. and enables user interactions with application logic 201. Component 213 may incorporate a set of graphical user interface (GUI) controls in the graphical user interfaces such as buttons, menus, text boxes, and other interactive elements that allow users to input data and interact with the system. Component 213 may interact with other components of application logic 201, such as the business logic layer, the data access layer, and the communication layer. For example, when a user enters data into a text box, the user interface component may communicate with the business logic layer to process the data and update the underlying data model. Component 213 is further configured to receive input 222, input 229, and input 227 and to generate user interface 235.

In an embodiment, engine 203 receives input 221. Input 221 includes a context of an automation system design, such as creating a new data model, opening an incomplete data model, adding a device to a data model or otherwise editing an existing data model, associating a device with a controller, accessing error logs of a device or system, and the like. Input 221 may also include a drag-and-drop of a graphic representation of an industrial device (e.g., a driver of a conveyor system, a pump, a motor, a compressor, a valve, a robot, a program logic controller, etc.), an alpha-numeric query (e.g., a request for information, a request for help, a request to troubleshoot a device of an industrial automation environment, etc.), the creation of a link between a remote/ agent computing device and a host computing device, a mouse click, a gesture, a voice command, etc.

Responsive to receiving input 221, engine 203 generates prompt 223. Prompt 223 includes a natural language query requesting troubleshooting information (e.g., identification of an anomaly type, a solution that addresses the anomaly type, a request for a user interface message to surface based on input 221, etc.). Engine 203 then transmits prompt 223 to API 205. API 205 transmits the prompt to an LLM (e.g., model 103 of FIG. 1) and receives response 225 from the LLM. API 205 then transmits response 225 to module 207.

Module 207 validates response 225. For example, module 207 may validate response 225 by performing a semantic analysis, sentiment analysis, topic modeling process, or the like. In some embodiments, Module 207 may validate a response from the LLM using the LLM by generating a prompt including the response in the prompt for validation. In such cases, the prompt including the response may be submitted as input 227 to engine 203 for obtaining the validation. In some embodiments, module 207 may validate a response, for example against a specification, such as validating controller code, power supply requirements, communication protocols, device settings, or the like. If module 207 determines that response 225 is invalid (e.g., response 225 includes a hallucination, an unacceptable anomaly type, an inaccurate solution, etc.), then module 207 may generate input 227 and transmit input 227 to engine 203. Input 227 may include context for generating a follow-up prompt for submission by API 205 to the LLM. Alternatively, module 207 may generate input 229 and transmit input 229 to component 213. Input 229 may include context for generating a GUI that includes a request for additional information, a GUI that indicates an answer to the query is "unknown," and the like. If module 207 determines that response 225 is valid, then module 207 generates response 230 and transmits response 230 to component 213. Response 230 includes content of response 225 in some embodiments.

Prior to transmitting response 230, module 207 may alternatively generate response 231 and transmit response 231 to module 211. Response 231 includes content of response 225, which module 211 analyzes to generate indication 233. For example, module 211 may provide a confidence rating (e.g., 80% confident that the response is accurate, etc.) or a confidence score (e.g., high confidence, low confidence, etc.) based on response 231. The higher the rating and/or score, the greater confidence module 211 has in the accuracy of the response. After generating indication 233, module 211 transmits indication 233 to module 207, which incorporates indication 233 with response 230.

Component 213 receives response 230 (or input 229) from module 207 and generates user interface 235 based on response 230 (or input 229). If response 230 includes indication 233, then user interface 235 may present the content of indication 233 as a confidence level having a rating (e.g., 65% confident of the response's accuracy), having a color-coded score (e.g., a green color indicates high confidence, a red color indicates a low confidence, etc.), and the like.

FIG. 3 illustrates a series of steps for troubleshooting a device and/or system in accordance with some embodiments of the present technology, and FIG. 4 illustrates exemplary operational scenario 400 in accordance with embodiments of the present technology. FIG. 3 includes process 300, each operation of which is noted parenthetically in the discussion below with reference to elements of FIG. 4. FIG. 4 includes computing system 101, application 107, and model 103 of FIG. 1. It may be appreciated that process 300 can be implemented in software, firmware, hardware, or any combination thereof and is representative of at least some of the functionality of application 107 of FIG. 1 and application logic 201 of FIG. 2. It may be further appreciated that process 300 is representative of troubleshooting process 806 of FIG. 8.

In operation, application 107 receives an input comprising a context of an automation system design (step 301). For example, a user may interact with a GUI of application 107 to associate a device with a controller, edit an existing data model, review error logs, submit a helpdesk request, and the like; a troubleshooting specialist may remotely link to a user's host application environment; etc., which application 107 receives as an input. Alternatively, the user may submit a query via an input device (e.g., keyboard, microphone, stylus, etc.) of computing system 101, which application 107 receives as an input. Application 107 may also receive the input as a mouse click of a selectable interface element, a gesture, a voice command, etc.

After receiving the input, application 107 generates a first prompt requesting identification of an anomaly type associated with the context of the automation system design (step 303). The first prompt may be generated in response to receiving the input. The first prompt may be generated in response to receiving, via the GUI, a second input requesting troubleshooting assistance. The first prompt may be generated in response to detecting the anomaly, such as detecting a device failure, system malfunction, failure to connect a device with a controller, etc. Application 107 may detect the anomaly by scanning the content of a user interface for key phrases (e.g., failure, error, warning, etc.), by extracting content of a user interface and asking a ML model to detect an anomaly based on the extracted content, etc. In the same or alternative embodiment, application 107 may generate a prompt requesting why the anomaly occurred (e.g., why did a connection fail, etc.).

The first prompt may be generated based on system information of the automation system design, such as power capabilities of the system, attributes of the system, relationships between the devices of the system, data models of the system, device type (e.g., pump, actuator, motor, sensor, etc.), controller type (e.g., programmable logic controller, etc.), system taxonomy (e.g., communication protocols, connected devices, product inputs, product outputs, etc.), etc. Application 107 may generate the first prompt by providing the input to a natural language model that transforms the input into an embedding. The embedding may be included in the first prompt and used by model 103 to select relevant content from an embedding database (e.g., using natural language).

The first prompt may include aspects of the user input, such as data extracted from a user interface, all or portions of a query input, etc. The first prompt may include acceptable responses (e.g., acceptable anomaly types, etc.). The first prompt may include a required response. For example, the first response may indicate a required response to surface if an answer to the prompt is unknown or otherwise cannot be identified (e.g., "I'm sorry, I'm unable to answer your query," etc.). In the same or other embodiment, the first response may indicate which phrase to include as part of a required response (e.g., "include the following at the end of your response: Do you require additional assistance," etc.). In the same or other embodiment, the first response may indicate when to include a request for additional information in the required response (e.g., "when an anomaly type is unknown, ask the user to identify the anomaly type, in natural language as if you were a service desk employee").

Application 107 transmits the first prompt to model 103 (step 305). In the present embodiment, model 103 was trained via application 107 using content of an embedding database (not shown) such as error logs; saved projects; past workflows of industrial automation environments; helpdesk entries associated with the devices and systems of industrial automation environments; product catalogs associated with devices, controllers, systems, etc. of an industrial automation environment; scientific publications associated with troubleshooting devices, controllers, systems, etc. of an industrial automation environment; defined bills of materials; etc. Based on its training, model 103 generates a response in accordance with the instructions of the first prompt and transmits the response to application 107. Application 107 receives the response to the first prompt from model 103 (step 307), which includes the requested anomaly type. Application 107 may validate the response by using machine learning techniques to evaluate the quality and/or accuracy of the response.

In the same or alternate embodiment, application 107 may determine that the anomaly type requires the assistance of a human operator. For example, application 107 may determine that the anomaly type cannot or should not be resolved through automated responses. In such instances, application 107 may route a troubleshooting inquiry to a human operator (not shown). To route the troubleshooting inquiry to the human operator, application 107 may match the anomaly type to a database of pre-defined anomaly types (e.g., the embedding database, etc.) and identify a human operator designated to receive inquiries associated with the anomaly type. Application 107 may then generate a connection between computing system 101 and a computing device of the human operator (that is remote to computing system 101) to support a conversation between the human operator and a user of computing system 101. Application 107 may provide a user interface to computing system 101 that indicates the troubleshooting inquiry is being directed to a human operator.

If application 107 does not reroute the troubleshooting inquiry, then application 107 may generate a second prompt requesting a solution that addresses the anomaly type (step 309). The second prompt may further include an instruction requesting the LLM to provide a message to surface in a user interface that offers assistance employing the solution. The second prompt may include aspects of the initial user input, the system information, the anomaly type, acceptable responses, required responses, etc. The second prompt may include acceptable responses (e.g., acceptable anomaly types, etc.) and required response. For example, the second response may indicate a required response to surface if an answer to the prompt is unknown or otherwise cannot be identified (e.g., "I'm sorry, I'm unable to identify a solution," etc.). In the same or other embodiment, the second response may indicate which phrase to include as part of a required response (e.g., "include the following at the end of your response: Do you require additional assistance," etc.). In the same or other embodiment, the second response may indicate when to include a request for additional information in the required response (e.g., "when a solution cannot be identified, ask the user to for additional information about the system taxonomy in which the device operates, in natural language as if you were a service desk employee").

Application 107 then transmits the second prompt to model 103 (step 311). Based on its training, model 103 generates a response to the second prompt and transmits the response to application 107. Application 107 receives the response to the second prompt from model 103, including the solution that addresses the anomaly type (step 313). After receiving the response, application 107 generates a GUI that includes the solution. The GUI may also include a message offering to employ the solution and requesting user input that indicates an acceptance or a refusal to have application 107 employ the solution. Application 107 then transmits the GUI to computing system 101 for display by computing system 101 (step 315).

Computing system 101 may receive, via the GUI, a user input that indicates an acceptance of the troubleshooting assistance and may transmit the input to application 107. Subsequent to receiving the input, application 107 may employ the solution, for example, by completing the connection between a device and a controller, amending controller code, amending a ladder logic, amending a graphical representation of a device or system, updating the automation system design, altering a data model (e.g., create a new system model, modify an existing system model, modify a draft of the system model, etc.), etc. Application 107 may then generate an updated GUI that includes a representation of the changes made. The updated GUI may also include a message requesting user feedback.

Figure 5:
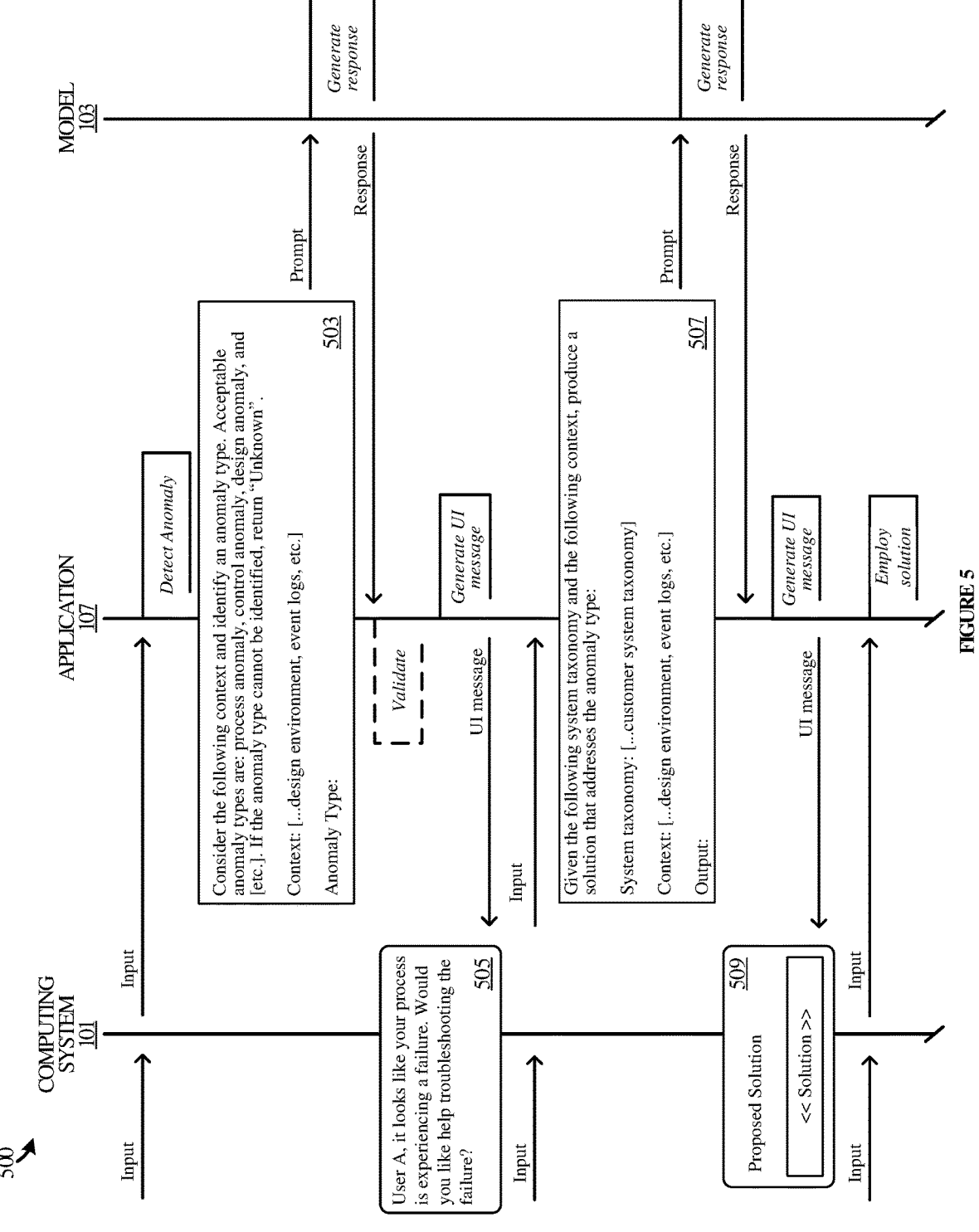
FIG. 5 illustrates an exemplary operational scenario in accordance with some embodiments of the present technology.

FIG. 5 illustrates exemplary operational scenario 500 in accordance with some embodiments of the present technology. The elements of operational scenario 500 include computing system 101, application 107, and model 103 of FIG. 1.

In operation, a user interacts with a GUI of application 107 via an input device of computing system 101 (e.g., keyboard, mouse, microphone, stylus, camera, etc.), which application 107 receives as an input. Example inputs include viewing an error log; submitting a query, a mouse click of a selectable interface element, a gesture, a voice command, a drag-and-drop of interface element, etc.; opening an existing system design project (e.g., a saved project, etc.), creating a new data model, editing an existing data model, etc. The input received by application 107 includes a context of an automation system design. The context of the automation system design may include content of a design environment (e.g., ladder logic, graphical representations of devices, etc.), attributes of the user input (e.g., adding a new device, connecting devices, editing device configuration, editing relationships between devices of a system, editing inputs to or outputs from a device, viewing error logs, receiving a failure notification, etc.), information stored in association with a user's account, information stored in association with a customer company, etc.

Responsive to the user input, application 107 detects an anomaly. For example, application 107 may detect the anomaly based on an analysis of the context of the automation system design. Specifically, application 107 (e.g., via a prompt generation engine, etc.) may detect the anomaly by providing the context of the automation system design to a natural language model that transforms the context into an embedding. The embedding may be placed in a prompt and used by an ML model (e.g., model 103) to select relevant content from an embedding database. The ML model may respond to the prompt with an indication that an anomaly is present in the automation system design. After receiving the prompt, model 103 replies to application 107 with the requested troubleshooting information.

In response to the user input and/or detecting the anomaly, application 107 generates prompt 503 (e.g., via engine 203 of FIG. 2). Prompt 503 includes an instruction requesting an LLM to identify an anomaly type based on the context of the automation system design. Prompt 503 also includes acceptable anomaly types (e.g., process anomaly, control anomaly, design anomaly, etc.), and a required response if the type of anomaly cannot be identified (e.g., "Unknown"). Prompt 503 further includes the context that the LLM is to analyze (e.g., " . . . design environment, event logs, etc."). Application 107 then transmits prompt 503 to model 103.

In the present embodiment, model 103 was trained using content of an embedding database (not shown), which may include error logs, example anomaly types, past workflows of industrial automation environments, helpdesk entries associated with the devices and systems of industrial automation environments, product catalogs associated with a plurality of devices and/or a plurality of controllers, scientific publications associated with a plurality of devices and/or a plurality of controllers, defined bill of materials, etc. Model 103 may have been trained to respond to prompt 503 by ingesting data models that differed in context, scope, application, etc. and which made up at least some of the content of the embedding database. Based on its training and the content of the embedding database, model 103 generates a response to prompt 503. The response may include the requested anomaly type and/or a required response. Model 103 then transmits the response to application 107.

Upon receiving a response to prompt 503, application 107 may validate the response. Validating the response includes determining that the response is one of the acceptable anomaly types. If the response is invalid (e.g., does not include an acceptable anomaly type, etc.), application 107 may regenerate prompt 503 and transmit the regenerated prompt to model 103, repeating this action until a valid response is returned by model 103. For example, an invalid response may indicate that the anomaly is "Unknown." An anomaly may be unknown because there is not enough data available, data may be missing, etc. As the user continues to interact with application 107, application 107 may regenerate prompt 503 with the updated context of the new interactions and submit the updated prompt 503 to model 103. In some embodiments, application 107 may use model 103 to validate the response by generating a prompt requesting validation of the response and submitting the prompt to model 103.

Subsequent to receiving and/or validating the response, application 107 generates a user interface message and transmits the message to computing system 101 for display as message 505. Application 107 may use a user interface component module to generate message 505. In the same or alternative embodiment, application 107 may generate a prompt (e.g., via engine 203) requesting an LLM to formulate the content of message 505 (e.g., asking whether the user would like troubleshooting assistance, etc.). The prompt (not shown) would include the context and information pertaining to the anomaly that was presented to application 107 in the response to prompt 503 (e.g., generalized information about the anomaly, etc.). The information pertaining to the anomaly may be retrieved by application 107 (e.g., via engine 203) from an embeddings database.

Computing system 101 then receives, via the GUI, a user input that includes feedback to the personalized message. The feedback may indicate an acceptance of the troubleshooting assistance request, a rejection of the troubleshooting assistance, a correction to the category noted in user interface message 505, etc. Application 107 may then process the feedback, which may include updating the embedding database based on the feedback, regenerating prompt 503 based on the feedback, etc.

In the present embodiment, the input includes an acceptance of the help offered in message 505. Application 107 then generates prompt 507 (e.g., via engine 203), which includes an instruction requesting the LLM to produce a solution that addresses the anomaly type (e.g., process failure, etc.). Prompt 507 further includes the context of the automation system design (e.g., " . . . design environment, event logs, etc.") and the system taxonomy (e.g., " . . . customer system taxonomy"). The system taxonomy may be obtained by application 107 (e.g., via engine 203) from stored customer data, account data associated with the user, a data model, the embeddings database, etc.

Application 107 transmits prompt 507 to model 103, which was trained to ingest system taxonomies and/or context of automation system designs to generate or otherwise output solutions that address various anomaly types. Based on its training, model 103 may generate a response to the prompt 507 that includes a solution that addresses the anomaly type and/or a required response based on the parameters of prompt 507. Model 103 then transmits the response to application 107.

Application 107 receives the response to prompt 507, which includes the solution that addresses the anomaly type. Application 107 may optionally validate the response, for example, by determining that the response includes an acceptable solution according to the system taxonomy (e.g., power capabilities of the system, etc.), application type, etc. If the response is invalid (e.g., does not include an acceptable solution, etc.), application 107 may regenerate prompt 507 and transmit the regenerated prompt to model 103, repeating this action until a valid response is returned by model 103. In some embodiments, application 107 validates the response using model 103 by generating a prompt requesting validation of the response and submitting the prompt to model 103.

Subsequent to receiving and/or validating the response, application 107 generates a user interface message that includes the solution that addresses the anomaly type that was provided by model 103 in the response to prompt 507. The user interface message may also include a message requesting the user to provide feedback on the content of the user interface message (e.g., accepting the solution, rejecting the solution, editing the solution, etc.). Application 107 then transmits the user interface message to computing system 101 for display by computing system 101 as message 509.

Computing system 101 receives, via the user interface message, a user input that includes feedback on the content of message 509. Responsive to the user input, application 107 may employ the solution that addresses the anomaly type, such as a solution to overcome the process failure noted in message 505 (e.g., altering an input of the process, updating a data model of the process, changing the power supply to a device of the process, etc.).

Figure 6:
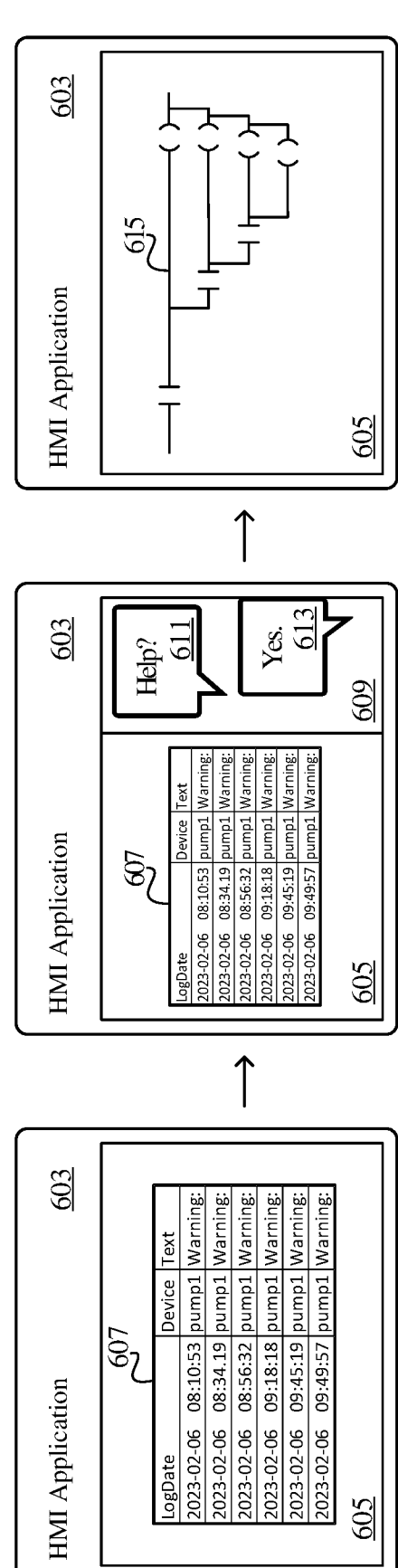
FIG. 6 illustrates an exemplary user interface in accordance with some embodiments of the present technology.

FIG. 6 illustrates an exemplary user interface 603 to an HMI application (e.g., application 107 of FIG. 1) that employs a troubleshooting process (e.g., process 300 of FIG. 3) in accordance with some embodiments of the present technology. User interface 603 includes canvas 605, which initially includes error log 607. Responsive to detecting error log 607, the HMI application employs a troubleshooting process to generate a prompt (not shown) for submission to an LLM (not shown). The prompt may include a natural language query requesting the LLM to identify, based on a context of error log 607, an anomaly type and/or a solution that addresses the anomaly type. Examples of context include a context of the automation system design, an interaction context such as a history of a user's interactions with error log 607, user context such as information stored in association with a user's account (e.g., customer information, systems data of an existing industrial automation environment, etc.), a product type, an application type, a network topology, a customer company, a power capability, available IP addresses, Azure® subscription identifiers, etc. After receiving the prompt, the LLM transmits a response (not shown) to the HMI application. The response may include the anomaly type, a user interface message requesting feedback, a suggested solution that addresses the anomaly type, and the like.

The HMI application may then display messaging panel 609 adjacent to canvas 605 in user interface 603. Messaging panel 609 is representative of a chat window through which a user communicates with the HMI application. Messaging panel 609 may include buttons, menus, or images that can be used to provide additional information or context. Though messaging panel 609 is depicted as being a sidebar panel of user interface 603, it is contemplated herein that messaging panel 609 can be any user interface component capable of supporting user interactions with the HMI application in a natural and conversational manner. For example, messaging panel 609 may be a popup or dialog window that overlays the content of canvas 605, and the like.

Messaging panel 609 includes messages 611 and 613. The HMI application may generate and surface message 611, for example in response to detecting error log 607, in response to receiving a response from the LLM, in response to a query submitted by the user, etc. In the present embodiment, message 611 represents a display of a description of the anomaly type and an offer to troubleshoot the detected anomaly. Message 613 represents a user's reply to message 611, which includes a positive indication that "Yes," the user accepts the troubleshooting help proposed in message 611.

In response to message 613, the HMI application updates canvas 605 to include altered ladder logic 615. In the same or alternative embodiment, the HMI application may generate a new prompt (not shown) for submission to the LLM that requests a summary describing the alterations made to achieve altered ladder logic 615, which the HMI application may surface in user interface 603 after receiving the summary from the LLM.

Figure 7:
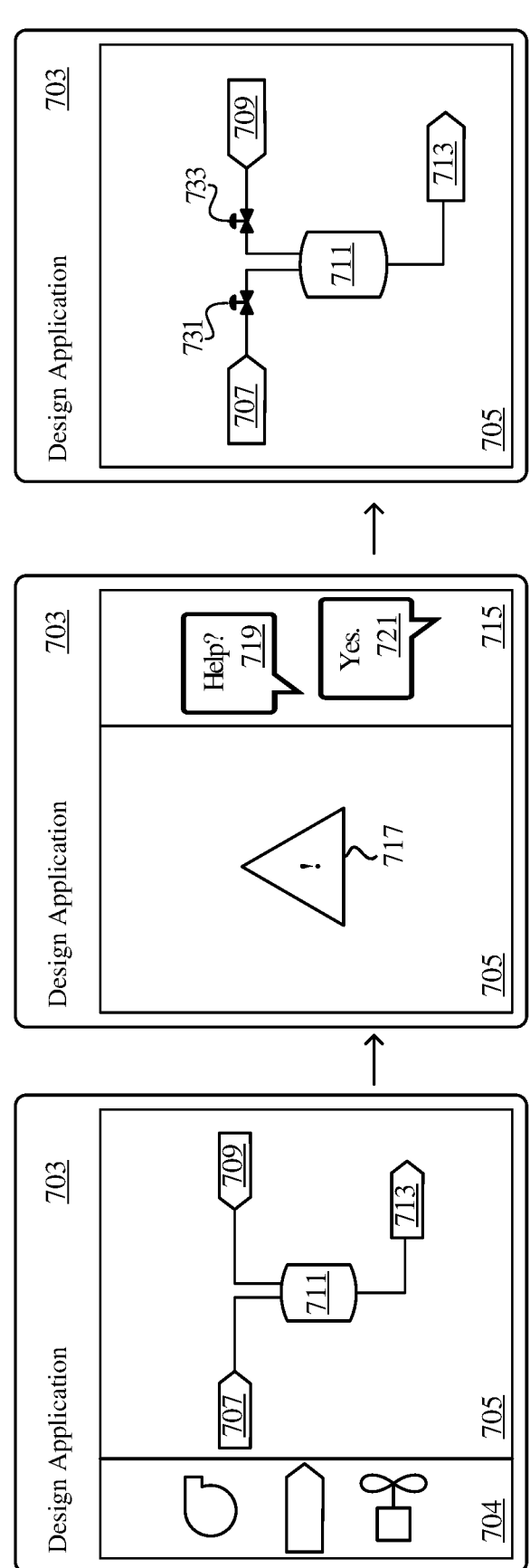
FIG. 7 illustrates an exemplary user interface in accordance with some embodiments of the present technology.

FIG. 7 illustrates an exemplary user interface 703 to an HMI application (e.g., application 107 of FIG. 1) that employs a device troubleshooting process (e.g., process 300 of FIG. 3) in accordance with some embodiments of the present technology. User interface 703 initially includes device menu 704 and canvas 705. Canvas 705 includes a system data model that comprises liquid feed 707, gas feed 709, reactor 711, and product 713, which were added to canvas 705 as a result of a user selecting their representative icon from device menu 704.

In response to detecting the system data model, the HMI application employs a troubleshooting process to generate a prompt (not shown) for submission to an LLM (not shown). The prompt may include a natural language query requesting the LLM to identify, based on a context of the system data model, an anomaly type and/or a solution that addresses the anomaly type. Examples of context include a context of the automation system design of the system data model, an interaction context such as a history of a user's interaction with the system data model, user context such as information stored in association with a user's account (e.g., customer information, systems data of an existing industrial automation environment, etc.), a product type, an application type, a network topology, a customer company, a power capability, available IP addresses, Azure® subscription identifiers, etc. After receiving the prompt, the LLM transmits a response (not shown) to the HMI application. The response may include the anomaly type, a user interface message requesting feedback, a suggested solution that addresses the anomaly type, and the like.

The HMI application may then update canvas 705 to indicate that anomaly 717 was detected. Examples of anomaly 717 include a device failure, a system malfunction, failure of a device to connect to a controller, insufficient power supply, improper inputs and/or outputs, etc. In the same or another embodiment, the HMI application displays messaging panel 715 adjacent to canvas 705 in user interface 703. Messaging panel 715 is representative of a chat window through which a user communicates with the HMI application. Messaging panel 715 may include buttons, menus, or images that can be used to provide additional information or context. Though messaging panel 715 is depicted as being a sidebar panel of user interface 703, it is contemplated herein that messaging panel 715 can be any user interface component capable of supporting user interactions with the HMI application in a natural and conversational manner. For example, messaging panel 715 may be a popup or dialog window that overlays the content of canvas 705, and the like.

Messaging panel 715 includes messages 719 and 721. The HMI application may generate and surface message 719, for example, in response to detecting the system data model, in response to receiving a response from the LLM, in response to a query submitted by the user, etc. In the present embodiment, message 719 represents a display of a description of the anomaly type and an offer to troubleshoot the detected anomaly. Message 721 represents a user's reply to message 719, which includes a positive indication that "Yes," the user accepts the troubleshooting help proposed in message 719.

In response to message 721, the HMI application updates canvas 705 to display an altered data model, which includes valve 731 placed in line with the connection between liquid feed 707 and reactor 711 and valve 733 placed in line with the connection between gas feed 709 and reactor 711. In the same or alternative embodiment, the HMI application may generate a new prompt (not shown) for submission to the LLM that requests a summary describing the differences between the system data model and the altered data model. The HMI application may then surface the summary in user interface 703 after receiving the summary from the LLM.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements troubleshooting process 806, which is (are) representative of the application service processes discussed with respect to the preceding Figures, such as process 300. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal or a transitory signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including troubleshooting process 806) may be implemented in program instructions and among other functions may, when executed by processing system 802, direct processing system 802 to operate as described with respect to the various operational scenarios, sequences, and processes illustrated herein. For example, software 805 may include program instructions for implementing an application service process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support an application service in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system or method and may include a computer program product, and other configurable systems. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating an interface service, the method comprising:

receiving, via a graphical user interface (GUI) of a human machine interface application, an input comprising a context of an automation system design;

generating a first prompt requesting identification of an anomaly type associated with the context of the automation system design, wherein the first prompt is generated based at least in part on system information of the automation system design;

transmitting the first prompt to a large language model;

receiving a first response to the first prompt from the large language model, the first response comprising the anomaly type;

generating, based on the system information and the anomaly type, a second prompt requesting a solution that addresses the anomaly type;

transmitting the second prompt to the large language model;

receiving a second response to the second prompt, the second response comprising the solution; and displaying, via the GUI, the second response.

2. The method of claim 1, further comprising:

validating the second response;

responsive to identifying a valid second response, displaying the second response;

responsive to identifying an invalid second response, repeating until a valid response is returned:

generating a new prompt requesting the solution based on the system information and the anomaly type;

transmitting the new prompt to the large language model;

receiving a new response to the new prompt; and validating the new response; and responsive to identifying a valid new response, displaying the new response.

3. The method of claim 1, further comprising routing an inquiry to a human operator based on the anomaly type.

4. The method of claim 1, wherein the first prompt comprises a required response if the anomaly type cannot be identified.

5. The method of claim 1, wherein the context of the automation system design includes one of content of a design environment and attributes of the user input.

6. The method of claim 1, further comprising training the large language model using helpdesk entries and product catalogs associated with the system information.

7. The method of claim 1, wherein generating the first prompt is in response to receiving the input.

8. The method of claim 1, wherein generating the first prompt is in response to receiving, via the GUI, a second input requesting assistance with troubleshooting at least an aspect of the automation system design.

9. The method of claim 1, wherein generating the first prompt is in response to detecting an anomaly.

10. The method of claim 1, further comprising, in response to receiving the first response, displaying, via the GUI, a message requesting user input indicating an acceptance or a refusal for help developing the solution.

11. The method of claim 10, wherein generating the second prompt is in response to receiving the user input indicating the acceptance.

12. The method of claim 1, wherein the displaying the second response comprises:

inputting the solution to a second machine learning model trained to generate a user interface message for displaying at least aspects of the solution;

receiving a third response comprising the aspects of the solution; and displaying, via the GUI, the third response.

13. The method of claim 12, wherein the second machine learning model is the large language model.

14. The method of claim 1, further comprising:

receiving, via the GUI, user input accepting the solution displayed in the second response; and changing the automation system design according to the solution.

15. A system, comprising:

one or more processors; and a memory having stored thereon instructions that, upon execution by the one or more processors, cause the one or more processors to:

receive, via a graphical user interface (GUI) of a human machine interface application, an input comprising a context of an automation system design;

generate a first prompt requesting identification of an anomaly type in the automation system design, wherein the first prompt is generated based at least in part on system information associated with the automation system design;

transmit the first prompt to a large language model;

receive a first response to the first prompt from the large language model, the first response comprising the anomaly type;

generate, based on the system information and the anomaly type, a second prompt requesting a solution that addresses the anomaly type;

transmit the second prompt to the large language model;

receive a second response to the second prompt, the second response comprising the solution; and display, via the GUI, the second response.

16. The system of claim 15, wherein the instructions further cause the one or more processors to:

receive a positive indication, via the graphical user interface, to the second response;

identify a system taxonomy associated with the automation system design;

input the system taxonomy and the anomaly type to a machine learning model trained to ingest system taxonomies and output solutions that address anomalies; and receive the solution that addresses the anomaly type.

17. The system of claim 15, wherein the instructions further cause the one or more processors to:

validate the second response;

responsive to identifying a valid second response, display the second response;

responsive to identifying an invalid second response, repeat until a valid response is returned:

generate a new prompt requesting the solution based on the system information and the anomaly type;

transmit the new prompt to the large language model;

receive a new response to the new prompt; and validate the new response; and responsive to identifying a valid new response, display the new response.

18. The system of claim 15, wherein the system information comprises at least one of a device type, a controller type, and a system taxonomy.

19. The system of claim 15, wherein to display the second response the instructions cause the one or more processors to:

input the solution to a machine learning model trained to generate a user interface message for displaying at least aspects of the solution;

receive a third response comprising the aspects of the solution; and display, via the GUI, the third response.

20. The system of claim 15, wherein the instructions further cause the one or more processors to:

receive, via the GUI, user input accepting the solution displayed in the second response; and change the automation system design according to the solution.

* * * * *